United States Patent
Roh et al.

(10) Patent No.: US 7,848,784 B2
(45) Date of Patent: Dec. 7, 2010

(54) APPARATUS FOR SAVING POWER BY USING LOCATION INFORMATION AND METHOD THEREOF

(75) Inventors: Yong Sung Roh, Icheon-si (KR); Jae Hoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 699 days.

(21) Appl. No.: 11/806,750

(22) Filed: Jun. 4, 2007

(65) Prior Publication Data

US 2008/0132298 A1      Jun. 5, 2008

(30) Foreign Application Priority Data

Nov. 30, 2006   (KR) ...................... 10-2006-0119683

(51) Int. Cl.
   *H04B 1/38*   (2006.01)
(52) U.S. Cl. ................. 455/574; 455/456.1; 455/404.2; 455/517; 701/213
(58) Field of Classification Search ................. 455/574, 455/456.1, 404.2, 517; 701/213
   See application file for complete search history.

(56) References Cited

U.S. PATENT DOCUMENTS

| | | | | |
|---|---|---|---|---|
| 5,353,332 A | * | 10/1994 | Raith et al. ................. | 455/455 |
| 6,078,826 A | * | 6/2000 | Croft et al. ................. | 455/574 |
| 6,970,708 B1 | * | 11/2005 | Raith .......................... | 455/440 |
| 6,975,941 B1 | * | 12/2005 | Lau et al. ..................... | 701/213 |
| 2007/0111703 A1 | * | 5/2007 | Holland et al. ........... | 455/404.2 |
| 2007/0178904 A1 | * | 8/2007 | Oyama ....................... | 455/445 |

FOREIGN PATENT DOCUMENTS

| | | |
|---|---|---|
| KR | 2004-41278 | 5/2004 |
| KR | 2005-107258 | 11/2005 |
| KR | 2006-43401 | 5/2006 |
| KR | 2006-68415 | 6/2006 |
| KR | 2006-84330 | 7/2006 |
| WO | WO 2004/045228 | 5/2004 |

* cited by examiner

*Primary Examiner*—Sanh D Phu
(74) *Attorney, Agent, or Firm*—NSIP Law

(57) ABSTRACT

An apparatus and method of saving power using location information, which can control power consumption of a mobile terminal in a sparse cell environment is provided. The power saving apparatus using location information comprises a transceiver for receiving a location information set from a base station having the stored location information set, a controller for receiving the location information set from the transceiver, and activating any one of a plurality of modes by using the location information set, where each of the plurality of modes utilizes a different power consumption level.

36 Claims, 7 Drawing Sheets

FIG. 7 ed on Nov. 30, 2006, in the Korean Intellectual Property Office, the entire disclosure of which is hereby incorporated by reference.

APPARATUS FOR SAVING POWER BY USING LOCATION INFORMATION AND METHOD THEREOF

CROSS-REFERENCE TO RELATED APPLICATIONS

This application claims the benefit under 35 U.S.C. §119 (a) of a Korean Patent Application No. 10-2006-0119683, filed on Nov. 30, 2006, in the Korean Intellectual Property Office, the entire disclosure of which is hereby incorporated by reference.

BACKGROUND OF THE INVENTION

1. Field of the Invention

The present invention relates to an apparatus and method for saving power using location information. More particularly, the present invention relates to an apparatus and method for saving power using location information, which can control power consumption of a mobile terminal in a sparse cell environment.

2. Description of Related Art

A wireless local area network (WLAN) service may allow for secure high speed data transmission, but may have comparatively smaller service coverage. Therefore, services using a WLAN may be utilized in an urban area or an area crowded with people, for example, an airport, a shopping mall, and the like; however, the services using a WLAN may be unavailable outside of the service coverage. A wireless broadband Internet (WiBro) service has been introduced to solve the above-described problem and provide high speed mobile data communication to subscribers without restriction to a time and an occasion. However, significant development time is still needed to provide users with the WiBro service which is available without restriction to a time and an occasion through a country in a manner similar to a mobile communication. Accordingly, the WiBro service is similarly expected, at least initially, to only provide hot-spot services based on population-dense areas, as with the wireless LAN service.

A WLAN/WiBro terminal periodically attempts a WLAN/WiBro network search and displays results of the search on a monitor to inform a user of accessibility to a WLAN/WiBro. Here, all corresponding modems should be powered on and therefore the WLAN/WiBro terminal consumes a great amount of power from installed batteries. Also, in comparison to a service coverage of the mobile communication, the WLAN/Wibro service has comparatively narrower service coverage and thus may be very ineffective.

Accordingly, an apparatus and method of saving power using location information, which can control power consumption of a mobile terminal in a sparse cell environment, is needed.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method of saving power using location information, where the mode of operation changes according to location information provided from a location-based service (LBS) server, thereby reducing power consumption of a mobile terminal.

According to an aspect of exemplary embodiments of the present invention, there is provided a power saving apparatus using location information, including a transceiver for receiving a location information set from a base station, the base station storing the location information set, and a controller for receiving the location information set from the transceiver, and activating any one of a plurality of modes by using the location information set, each of the plurality of modes utilizing a different power consumption level.

According to another aspect of exemplary embodiments of the present invention, there is provided a method of saving power in a power saving apparatus using location information, the method including receiving a location information set from a base station, and activating any one of a plurality of modes by using the location information set, each of the plurality of modes utilizing a different power consumption level.

According to still another aspect of exemplary embodiments of the present invention, there is provided a method of saving power of a mobile terminal in a base station, the method including storing a first location information set which comprises base station location information about a location of each of at least one base station, and base station coverage information about a coverage of each of the at least one base station, and transmitting the first location information set to the mobile terminal.

Other aspects, advantages, and salient features of the exemplary embodiments of the present invention will become apparent to those skilled in the art from the following detailed description, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
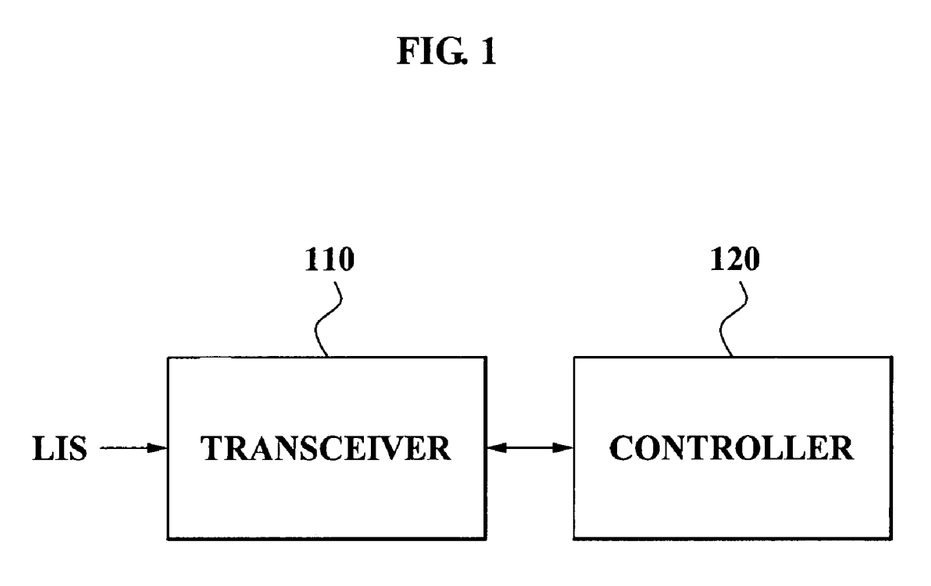
FIG. 1 is a block diagram illustrating a power saving apparatus using location information according to an exemplary embodiment of the present invention.

FIG. 1 is a block diagram illustrating a power saving apparatus using location information according to an exemplary embodiment of the present invention. As shown in FIG. 1, the power saving apparatus using location information includes a transceiver 110 and a controller 120.

The transceiver 110 functions to receive a location information set from a base station, and outputs the received location information set to the controller 120. In an exemplary implementation of the present invention, the base station provides the location information to a mobile terminal. Hereinafter, a Radio Access Station (RAS) will be described as an example of the base station, however, the base station is not limited to the RAS.

Additionally, the location information set may include 1) base station location information about a location of each of at least one base station, 2) base station coverage information about a coverage of each of the at least one base station, and 3) version information of the location information set. For example, the location information set may include RAS location information corresponding to global location information of a RAS, and version information which indicates a cell type of the RAS and a version of the RAS location information.

The global location information of the RAS may be in a format of a National Marine Equipment Association (NMEA) sentence, however, the present invention is not limited thereto. Specifically, the global location information of the RAS may be recorded in various types of location information formats and utilized. Also, the cell type, which is utilized as an example of the base station coverage information, may be divided into a Pico cell, Micro cell, a Macro cell, and the like, according to a base station coverage radius, however, the present invention is not limited thereto. The Pico cell has about a 100 m coverage radius, the Micro cell has about a 400 m coverage radius, and the Macro cell has about a 1 Km coverage radius.

Additionally, the controller 120 may function to receive the location information set from the transceiver 110, and activate any one of a plurality of modes by using the location information set. Here, each of the plurality of modes utilizes a different power consumption level. The plurality of modes includes a sleep mode and an active mode, where the sleep mode consumes comparatively less power than the active mode.

Figure 2:
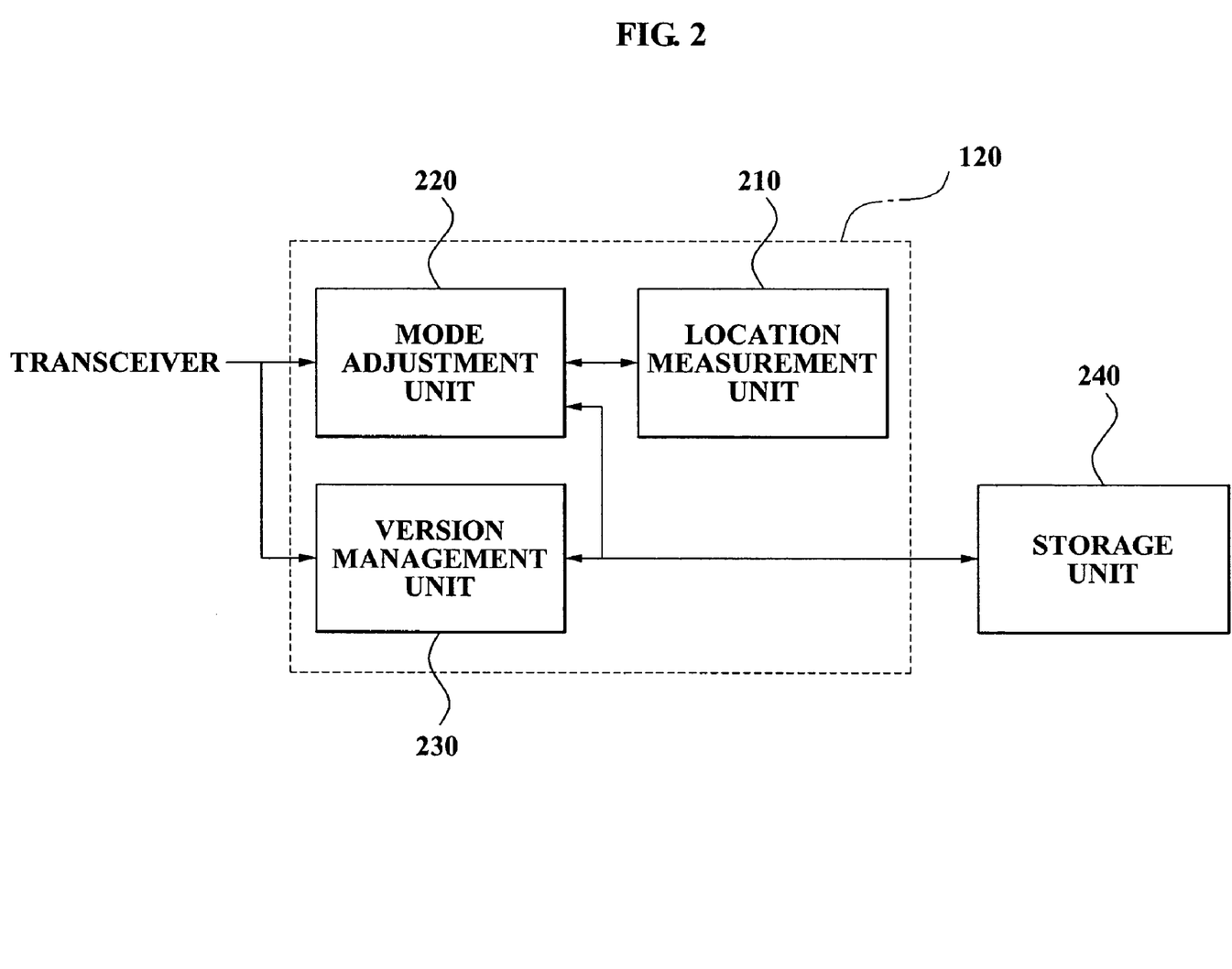
FIG. 2 is a block diagram illustrating an exemplary embodiment of a controller of the power saving apparatus shown in FIG. 1.

FIG. 2 is a block diagram illustrating a storage unit 240 and the controller 120 of the power saving apparatus using the location information. As shown in FIG. 2, the controller 120 may include a location measurement unit 210, a mode adjustment unit 220, and a version management unit 230.

The location measurement unit 210 is provided in the controller 120 and functions to determine a location of the power saving apparatus, generate self-location information by using the determined location, and output the generated self-location information to the mode adjustment unit 220. In an exemplary implementation of the present invention, the location measurement unit 210 may periodically track or determine the location of the power saving apparatus, for example, a mobile terminal, via a location-based service (LBS). The location measurement unit 210 may determine the location of the power saving apparatus using a Global Positioning System (GPS) function. Additionally, the location measurement unit 210 may acquire triangulation determination data by using at least two base stations, and determine the location of the power saving apparatus according to the acquired triangulation determination data. However, the present invention is not limited thereto.

The mode adjustment unit 220 is provided in the controller 120, and functions to receive the self-location information from the location measurement unit 210 and activate any one of the sleep mode and the active mode by using the self-location information and base station coverage information of the location information set. In an exemplary implementation of the present invention, the base station coverage information may be in the format of the cell type of the RAS, but is not limited thereto. For example, the mode adjustment unit 220 activates the active mode when a coverage radius according to the base station coverage information is greater than a distance from the power saving apparatus to a base station corresponding to the base station coverage information. Conversely, the mode adjustment unit 220 activates the sleep mode when a coverage radius according to the base station coverage information is less than or equal to a distance from the power saving apparatus to a base station corresponding to the base station coverage information.

According to another exemplary implementation of the present invention, the mode adjustment unit 220 identifies a second base station nearest to the power saving apparatus by using the self-location information and the base station location information of the location information set. The mode adjustment unit 220 activates the active mode when a distance between the power saving apparatus and the second base station is less than a coverage radius according to base station coverage information of the second base station. Conversely, the mode adjustment unit 220 activates the sleep mode when a distance between the power saving apparatus and the second base station is greater than or equal to a coverage radius according to base station coverage information of the second base station. It may be desirable that a second base station is set as an RAS nearest to a current location of the power saving apparatus, however, is not limited thereto.

The version management unit 230 is provided in the controller 120 and functions to compare version information of the location information set with version information of the previous location information set stored in the storage unit 240. Version management unit 230 updates the previous location information set to the location information set when a version of the previous location information set is determined to be an old version as a result of the comparison. Specifically, when the power saving apparatus, such as a mobile terminal, enters a service area of the base station supported by the location information set, the corresponding base station receives, from the mobile terminal, information about the location information set corresponding to the previous location information set that is currently maintained by the mobile terminal. Also, when the mobile terminal maintains a lower version of the location information set than the location information set maintained by the base station, the location information set maintained by the base station is provided to the mobile terminal.

The storage unit 240 functions to store the previous location information set pre-received from the transceiver 110, provide the stored previous location information set according to a control of the version management unit 230, and receive and store the location information set from the version management unit 230.

Figure 6:
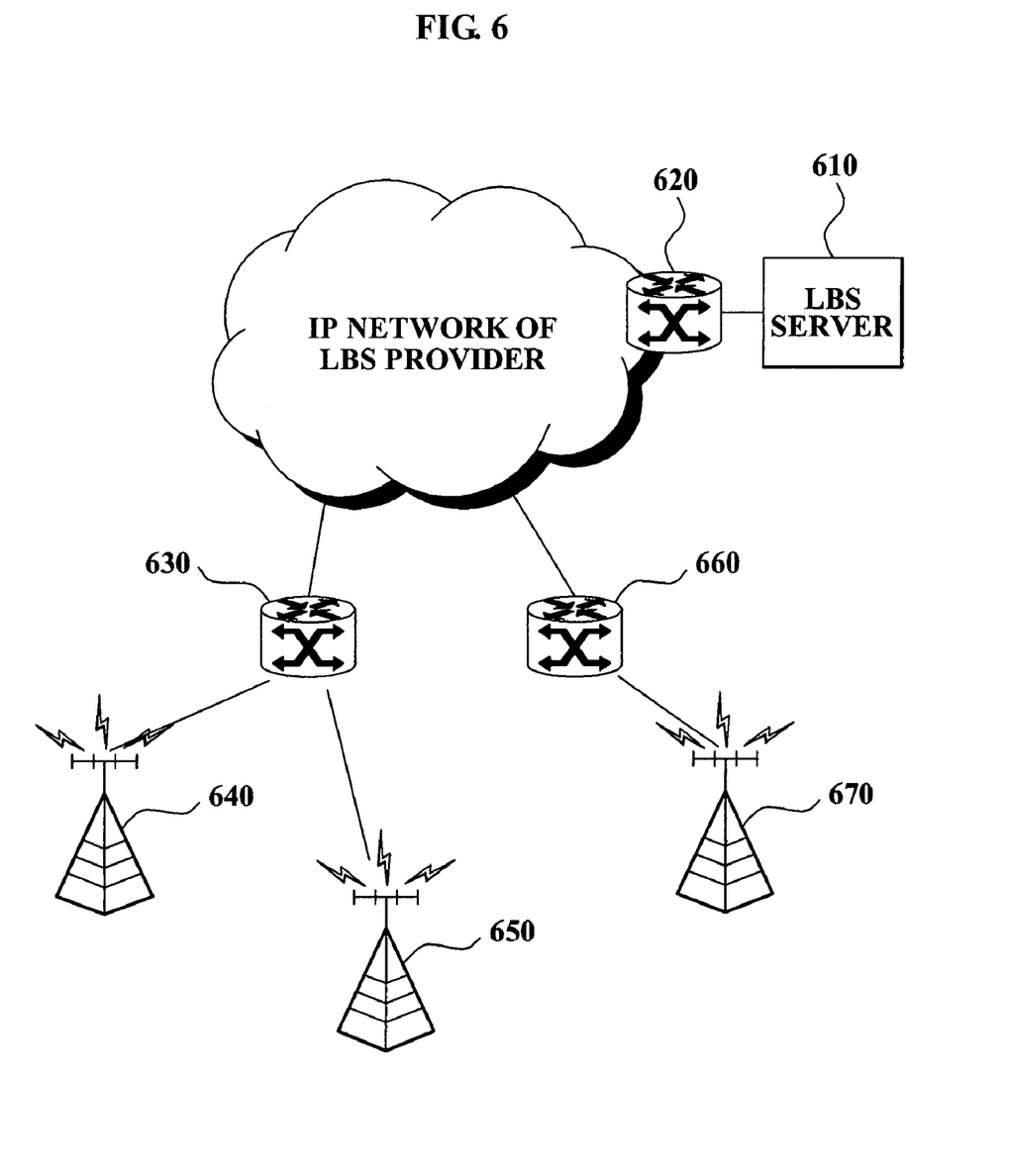
FIG. 6 illustrates a WiBro system using a power saving apparatus according to an exemplary embodiment of the present invention.

FIG. 6 illustrates a WiBro system using a power saving apparatus according to an exemplary embodiment of the present invention. Hereinafter, the Wibro system will be described as an example, however, the present invention is not limited thereto. The present invention may be applicable to all systems using a wireless access station.

Figure 7:
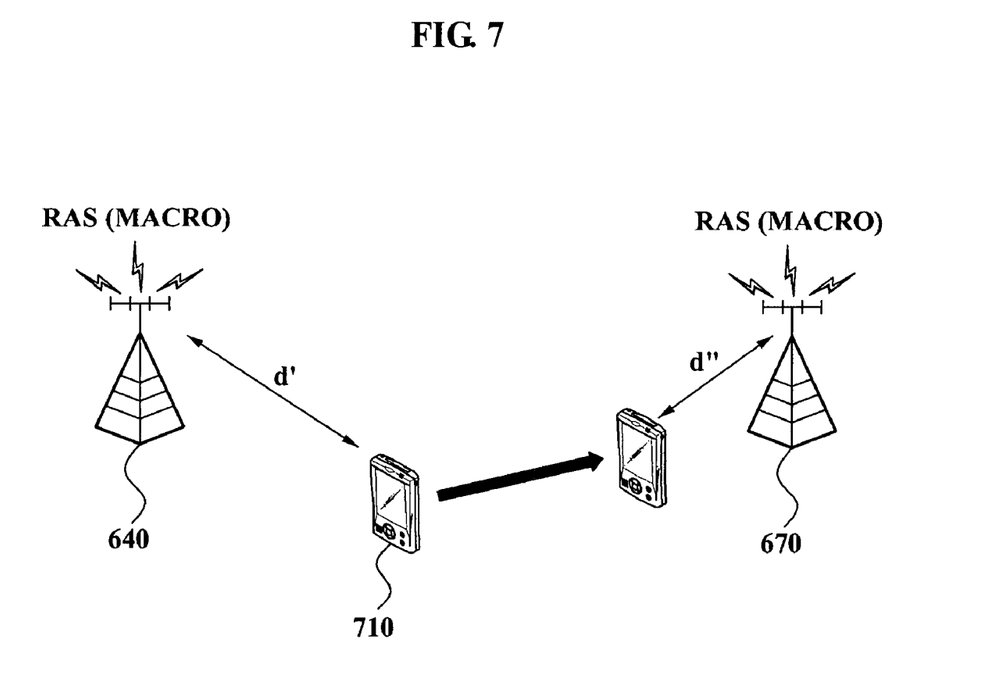
FIG. 7 illustrates an operation of a power saving apparatus according to an exemplary embodiment of the present invention.

FIG. 7 illustrates an operation of a power saving apparatus according to an exemplary embodiment of the present invention. Hereinafter, the operation of the power saving apparatus using the location information will be described with reference to FIGS. 1, 2, 6, and 7.

An LBS server 610 pre-collects RAS location information from RASs 640 and 670 where an LBS is available, among a plurality of RASs 640, 650, and 670, adds a cell type of a corresponding RAS, adds a version of a corresponding RAS location information, and generates a location information set. In an exemplary implementation of the present invention, the collected RAS location information may correspond to information about RASs in every area, for example, the whole country of Korea. Also, the collected RAS location information may correspond to information about RASs in a local area, for example, a predetermined city/province of Korea. The LBS server 610 can be connected to the IP network of the LBS provider via an Access Control Router (ACR) 620.

The RASs 640 and 670 where the LBS is available receive the location information set from the LBS server 610 via Access Control Routers (ACRs) 630 and 660. In an exemplary implementation of the present invention, the LBS server 610 may provide an updated location information set to the RASs 640 and 670 every time the location information set is updated. Also, the LBS server 610 may periodically provide the location information set per a predetermined updating period. For example, the RASs 640 and 670 where the LBS is available join a multicast address of an LBS multicast group. The LBS server 610 transmits a packet including the updated location information set by using the multicast address as a destination address. The packet with the updated location information set is transmitted to all the RASs 640 and 670 that join the multicast address. Each of the RASs 640 and 670 which receive the updated location information set stores and updates in each of the RASs 640 and 670 the location information set to the received location information set. In an exemplary implementation, the RASs 640 and 670 where the LBS is available receive the updated location information set from the LBS server 610, however, the present invention is not limited thereto. Specifically, the RASs 640 and 670 where the LBS is available may receive the updated location information set from another device.

When the RASs 640 and 670 where the LBS is available receives the updated location information set from another base station, including the LBS server 610, each of the RASs 640 and 670 compares version information of the stored location information set in each of the RASs 640 and 670 with version information of the received location information set. As a result of the comparison, when the received location information corresponds to a newer version compared to the stored location information set, each of the RASs 640 and 670 updates the stored location information to the received location information set.

When there is a change of a location or coverage of each of the RASs 640 and 670 where the LBS is available, each of the RASs 640 and 670 reflects the change and updates the location information set which is stored in each of the RASs 640 and 670. Also, each of the RASs 640 and 670 transmits the updated location information to another base station. For example, each of the RASs 640 and 670 where the LBS is available may transmit the updated location information to the LBS server 610 or to the multicast address of the joined LBS multicast group.

Each of the RASs 640 and 670 where the LBS is available stores the updated location information set. In an exemplary implementation of the present invention, the location information set includes 1) base station location information about a location of each of at least one base station comprising the base station, 2) base station coverage information about a coverage of each of the at least one base station, and 3) version information of the location information set.

When a mobile terminal 710 using the power saving apparatus, according to an exemplary implementation of the present invention, enters a service area of the RASs 640 and 670 where the LBS is available, each of the RASs 640 and 670 receives a copy of the stored location information set from the mobile terminal 710. Each of the RASs 640 and 670 compares version information of the location information set stored in the mobile terminal 710 with version information of the location information set stored in each of the RASs 640 and 670. When the location information set stored in each of the RASs 640 and 670 corresponds to a new version in comparison to the location information set stored in the mobile terminal 710, each of the RASs 640 and 670 transmits the location information set stored in each of the RASs 640 and 670 to the mobile terminal 710. Conversely, when the location information set stored in each of the RASs 640 and 670 corresponds to or is equal to the location information set stored in the mobile terminal 710, the location information set stored in each of the RASs 640 and 670 are not transmitted to the mobile terminal 710.

When the mobile terminal 710 using the power saving apparatus is powered on near the RAS 640 where the LBS is available, the transceiver 110 of the mobile terminal 710 receives the location information set from the RAS 640. When the location information set is not received from the RAS 640, the previous location information set stored in the storage unit 240 is referred to.

The controller 120 of the mobile terminal 710 activates any one of a plurality of modes by using the location information set or the previous location information set. Each of the plurality of modes utilizes a different power consumption level.

Specifically, the controller 120 of the mobile terminal 710 determines a location of the mobile terminal 710, generates self-location information by using the determined location, compares base station coverage information of the location set information or the previous location information set with the self-location information, and activates the sleep mode or the activate mode according to a result of the comparison. For example, as shown in FIG. 7, when a distance d' between the mobile terminal 710 and the base station 640 nearest to the mobile terminal 710 is greater than a base station coverage radius, the mobile terminal 710 activates the sleep mode.

Conversely, when the mobile terminal 710 moves and thus a distance d" between the mobile terminal 710 and the base station 670 nearest to the mobile terminal 710 is less than the base station coverage radius, the mobile terminal 710 activates the active mode.

Figure 3:
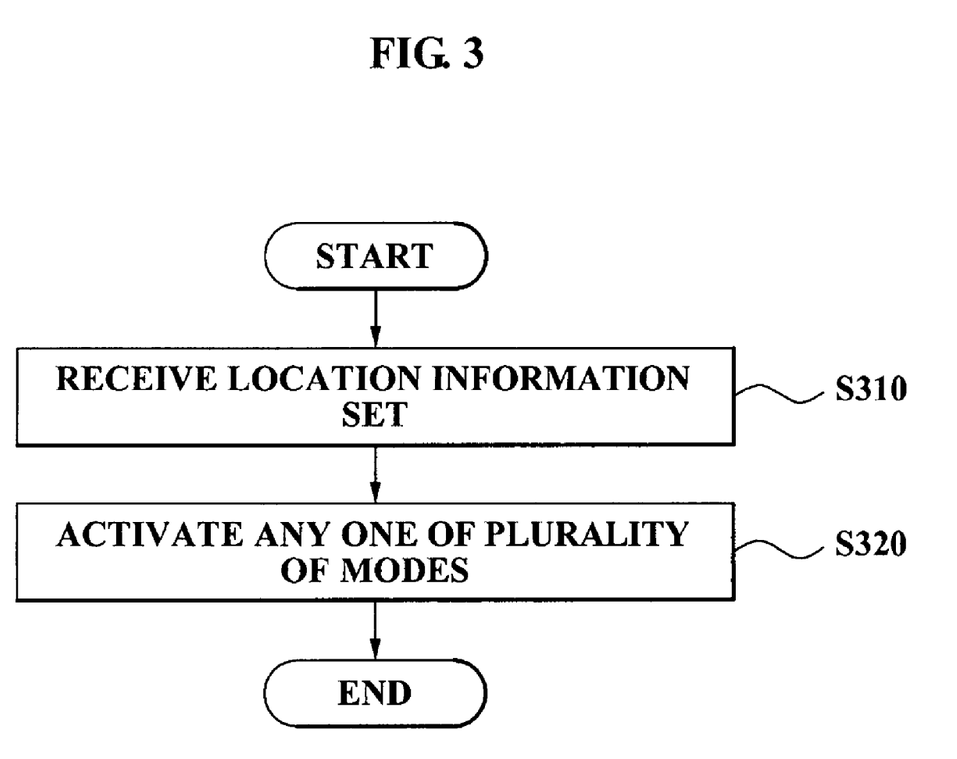
FIG. 3 is a flowchart illustrating a method of saving power using location information according to an exemplary embodiment of the present invention.

FIG. 3 is a flowchart illustrating a method of saving power using location information according to an exemplary embodiment of the present invention.

In step S310, the transceiver 110 of the mobile terminal 710 receives a location information set. In this instance, the location information set is similar to the location information set described with reference to FIG. 1 and thus further detailed descriptions will be omitted.

In step S320, the controller 120 of the mobile terminal 710 activates any one of a plurality of modes by using the location information set or a previous location information set stored in the storage unit 240. Here, each of the plurality of modes utilizes a different power consumption level.

Figure 4:
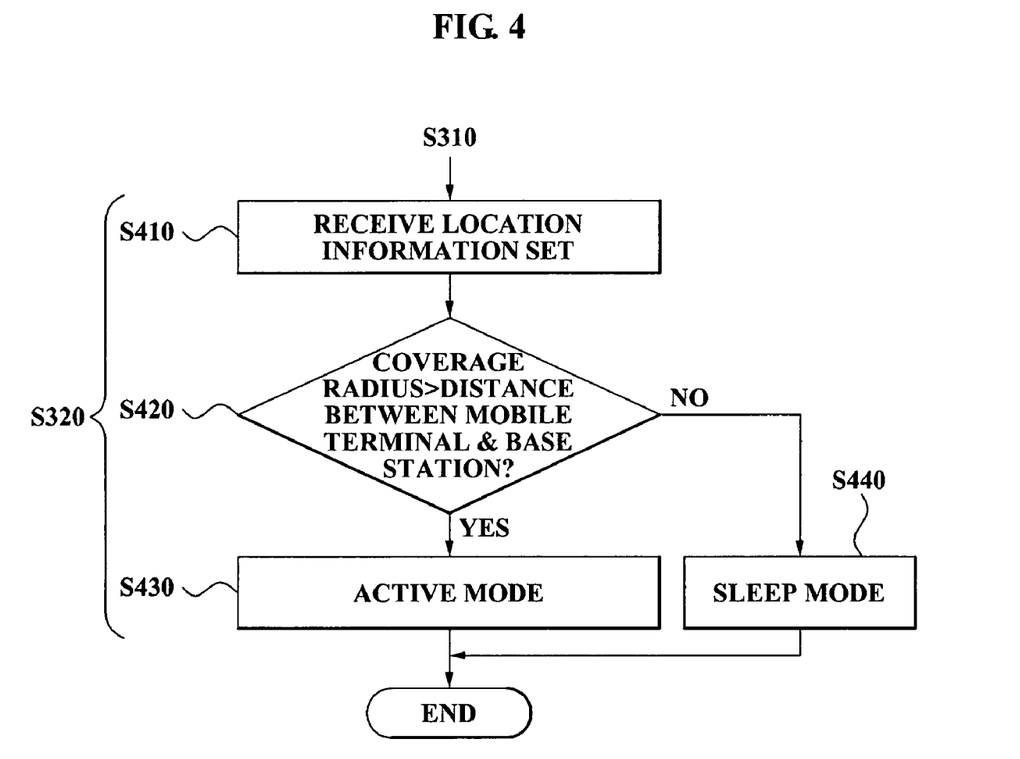
FIG. 4 is a flowchart illustrating an activating operation in a method of saving power using location information according to an exemplary embodiment of the present invention.

FIG. 4 is a flowchart illustrating operation S320 of FIG. 3 in a method of saving power using location information according to an exemplary embodiment of the present invention.

In step S410, the controller 120 of the mobile terminal 710 determines a location of the mobile terminal 710, and generates self-location information by using the determined location. In an exemplary implementation of the present invention, the controller 120 may periodically track or determine the location of the power saving apparatus, such as the mobile terminal 710, via an LBS. The controller 120 may determine the location of the mobile terminal 710 using a GPS function. Also, the controller 120 may acquire triangulation determination data by using at least two base stations, and determine the location of the mobile terminal 710 according to the acquired triangulation determination data. However, the present invention is not limited thereto.

In step S420, the controller 120 of the mobile terminal 710 compares base station coverage information of the location information set or the previous location information set with the self-location information, that is, compares a distance between the mobile terminal 710 and a base station nearest to the mobile terminal 710.

In step S430, the mobile terminal 710 operates in the active mode when the distance between the mobile terminal 710 and the base station 670 nearest to the mobile terminal 710 is less than a base station coverage radius.

Conversely, in step S440, the mobile terminal 710 operates in the sleep mode when the distance between the mobile terminal 710 and the base station 640 nearest to the mobile terminal 710 is greater than or equal to the base station coverage radius.

Figure 5:
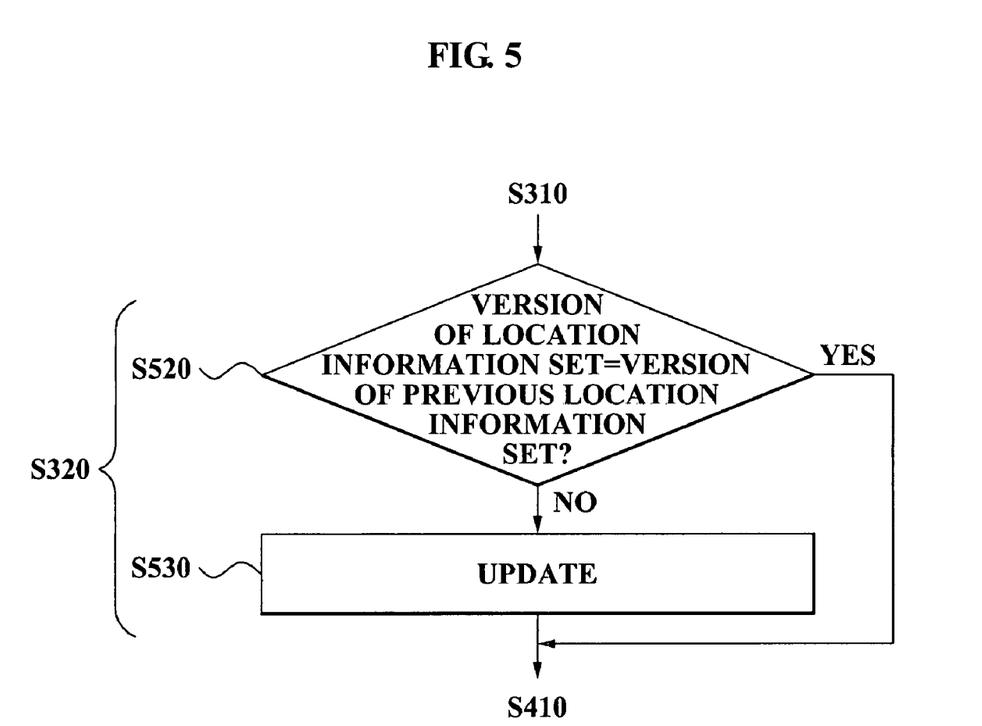
FIG. 5 is a flowchart illustrating an activating operation in a method of saving power using location information according to another exemplary embodiment of the present invention.

FIG. 5 is a flowchart illustrating operation S320 of FIG. 3 in a method of saving power using location information according to another exemplary embodiment of the present invention. The mobile terminal 710 may pre-receive a previous location information set from a base station and store the received previous location information set in the storage unit 240.

In step S520, the mobile terminal 710 compares version information of the location information set with version information of the stored previous location information set. In an exemplary implementation, the base station may acquire version information of the previous location information set from the mobile terminal 710 when the mobile terminal 710 enters the service area of the base station. The base station may transmit the location information set only when the mobile terminal 710 includes information about an old version.

In step S530, the mobile terminal 710 updates the previous location information set to the location information set since a version of the previous location information corresponds to the old version.

The power saving method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include, but are not limited to, magnetic media such as hard disks, floppy disks, and magnetic tape; optical media such as CD ROM disks and DVD; magneto-optical media such as optical disks; hardware devices that are specially configured to store and perform program instructions, such as read-only memory (ROM), random access memory (RAM), and flash memory. The above-described methods may also be embodied in transmission media, for example, carrier waves (such as data transmission through the Internet via wired or wireless transmission paths), and the like. The computer-readable recording media can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to exemplary embodiments of the present invention, an apparatus and method of saving power using location information can change mode by using location information, which is provided from an LBS server, and thereby reduce a power consumption of a mobile terminal.

While the present invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A power saving apparatus using location information, the apparatus comprising:
   a transceiver for receiving a location information set from a base station, the base station storing the location information set; and
   a controller for determining a location of the power saving apparatus and generating self-location information based on the determined location, comparing the self-location information to the received location information set, and activating any one of a plurality of modes based on the comparing, each of the plurality of modes utilizing a different power consumption level.

2. The power saving apparatus of claim 1, wherein the plurality of modes comprises a sleep mode and an active mode.

3. The power saving apparatus of claim 2, wherein the controller comprises:

a location measurement unit for determining the location of the power saving apparatus and generating self-location information by using the determined location; and a mode adjustment unit for receiving the self-location information from the location measurement unit and activating any one of the sleep mode and the active mode based on the self-location information and base station coverage information of the location information set.

4. The power saving apparatus of claim 3, wherein the location measurement unit determines the location of the power saving apparatus using a Global Positioning System (GPS) function.

5. The power saving apparatus of claim 3, wherein the location measurement unit acquires triangulation determination data by using at least two base stations, and determines the location of the power saving apparatus according to the acquired triangulation determination data.

6. The power saving apparatus of claim 3, wherein the mode adjustment unit activates the active mode when a coverage radius according to the base station coverage information is greater than a distance from the power saving apparatus to a base station corresponding to the base station coverage information.

7. The power saving apparatus of claim 3, wherein the mode adjustment unit activates the sleep mode when a coverage radius according to the base station coverage information is less than or equal to a distance from the power saving apparatus to a base station corresponding to the base station coverage information.

8. The power saving apparatus of claim 1, wherein the location information set comprises base station location information about a location of each of at least one base station, and the base station coverage information about a coverage of each of the at least one base station.

9. The power saving apparatus of claim 3, wherein the mode adjustment unit identifies a second base station nearest to the power saving apparatus by using the self-location information and the base station location information of the location information set.

10. The power saving apparatus of claim 9, wherein the mode adjustment unit activates the active mode when a distance between the power saving apparatus and the second base station is less than a coverage radius according to base station coverage information of the second base station.

11. The power saving apparatus of claim 9, wherein the mode adjustment unit activates the sleep mode when a distance between the power saving apparatus and the second base station is greater than or equal to a coverage radius according to base station coverage information of the second base station.

12. The power saving apparatus of claim 1, further comprising:

a storage unit for storing a previous location information set, wherein the controller receives the previous location information set from the storage unit, and activates any one of a plurality of modes by using the previous location information set, each of the plurality of modes utilizing a different power consumption level.

13. The power saving apparatus of claim 1, further comprising:

a storage unit for storing a previous location information set, wherein the controller further comprises:

a version management unit for comparing version information of the location information set with version information of the previous location information set stored in the storage unit, and updating the previous location information set to the location information set when a version of the previous location information set corresponds to an old version as a result of the comparison.

14. The power saving apparatus of claim 1, wherein the location information set includes information indicating whether the base station is a picocell, a microcell, or a macrocell.

15. A method of saving power in a power saving apparatus using location information, the method comprising:

determining a location of the power saving apparatus and generating self-location information based on the determined location;

receiving a location information set from a base station;

comparing the self-location information to the received location information set; and activating any one of a plurality of modes based on the comparing, each of the plurality of modes utilizing a different power consumption level.

16. The method of claim 15, wherein the plurality of modes comprises a sleep mode and an active mode.

17. The method of claim 16, wherein the activating further comprises:

activating any one of the sleep mode and the active mode based on the self-location information and base station coverage information of the location information set.

18. The method of claim 17, wherein the determining comprises:

determining the location of the power saving apparatus by using a GPS function.

19. The method of claim 17, wherein the determining comprises:

acquiring triangulation determination data by using at least two base stations; and determining the location of the power saving apparatus according to the acquired triangulation determination data.

20. The method of claim 17, wherein the activating comprises:

activating the active mode when a coverage radius according to the base station coverage information is greater than a distance from the power saving apparatus to a base station corresponding to the base station coverage information.

21. The method of claim 17, wherein the activating comprises:

activating the sleep mode when a coverage radius according to the base station coverage information is less than or equal to a distance from the power saving apparatus to a base station corresponding to the base station coverage information.

22. The method of claim 15, wherein the location information set comprises base station location information about a location of each of at least one base station, and the base station coverage information about a coverage of each of the at least one base station.

23. The method of claim 17, wherein the activating comprises:

identifying a second base station nearest to the power saving apparatus by using the self-location information and the base station location information of the location information set.

24. The method of claim 23, wherein the activating comprises:

activating the active mode when a distance between the power saving apparatus and the second base station is less than a coverage radius according to base station coverage information of the second base station.

25. The method of claim 23, wherein the activating comprises:
activating the sleep mode when a distance between the power saving apparatus and the second base station is greater than or equal to a coverage radius according to base station coverage information of the second base station.

26. The method of claim 15, wherein the activating comprises:
storing a previous location information set; and
activating any one of a plurality of modes by using the previous location information set, each of the plurality of modes utilizing a different power consumption level.

27. The method of claim 15, wherein the activating further comprises:
storing a previous location information set;
comparing version information of the location information set with version information of the previous location information set stored in the storage unit; and
updating the previous location information set to the location information set when a version of the previous location information set corresponds to an old version as a result of the comparison.

28. A method of a base station, the method comprising:
storing a first location information set which comprises base station location information about a location of each of at least one base station, and base station coverage information about a coverage of each of the at least one base station;
receiving a second location information set from a mobile terminal;
comparing the first location information set with the second location information set; and
transmitting the first location information set to the mobile terminal when the first location information set corresponds to a newer location information set in comparison to the second location information set.

29. The method of claim 28, further comprising:
transmitting a changed first location information set to another base station when the stored first location information set is changed.

30. The method of claim 28, further comprising:
joining a predetermined multicast address;
receiving a packet which has the multicast address as a destination address and comprises a third location information set; and
updating the stored first location information set to the third location information set.

31. The method of claim 28, further comprising:
receiving a packet from another base station, the packet comprising a third location information set; and
comparing the stored first location information set with the third location information set and updating the stored first location information set to the third location information set when the third location information set corresponds to a newer location information set in comparison to the first location information set.

32. The method of claim 28, wherein the first location information set includes information indicating whether the at least one base station is a picocell, a microcell, or a macrocell.

33. A computer-readable recording medium having stored thereon instructions for causing a base station to implement a method, the method comprising:
a first set of instructions for storing a first location information set which comprises base station location information about a location of each of at least one base station, and base station coverage information about a coverage of each of the at least one base station;
a second set of instructions for receiving a second location information set from a mobile terminal;
a third set of instructions for comparing the first location information set with the second location information set; and
a fourth set of instructions for transmitting the first location information set to the mobile terminal when the first location information set corresponds to a newer location information set in comparison to the second location information set.

34. The computer-readable recording medium of claim 33, further comprising:
a fifth set of instructions for transmitting a changed first location information set to another base station when the stored first location information set is changed.

35. The computer-readable recording medium of claim 33, further comprising:
a sixth set of instructions for joining a predetermined multicast address;
a seventh set of instructions for receiving a packet which has the multicast address as a destination address and comprises a third location information set; and
an eighth set of instructions for updating the stored first location information set to the third location information set.

36. The computer-readable recording medium of claim 33, further comprising:
a ninth set of instructions for receiving a packet from another base station, the packet comprising a third location information set; and
a tenth set of instructions for comparing the stored first location information with the third location information set and updating the stored first location information set to the third location information set when the third location information set corresponds to a newer location information set in comparison to the first location information set.

* * * * *